United States Patent
Wigren et al.

(10) Patent No.: US 8,401,570 B2
(45) Date of Patent: Mar. 19, 2013

(54) LTE FINGERPRINTING POSITIONING REFERENCES FOR OTHER CELLULAR SYSTEMS

(75) Inventors: Torbjorn Wigren, Uppsala (SE); Ylva Jading, Stockholm (SE); Claes Tidestav, Balsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 12/891,994

(22) Filed: Sep. 28, 2010

(65) Prior Publication Data

US 2011/0077030 A1 Mar. 31, 2011

Related U.S. Application Data

(60) Provisional application No. 61/247,145, filed on Sep. 30, 2009.

(51) Int. Cl.
 *H04W 4/02* (2009.01)
(52) U.S. Cl. .................. 455/456.5; 455/67.11
(58) Field of Classification Search ............... 455/67.11, 455/450, 456.1, 456.2, 456.3, 456.4, 456.5
See application file for complete search history.

(56) References Cited

U.S. PATENT DOCUMENTS

| 2003/0008668 A1 | 1/2003 | Perez-Breva et al. | |
|---|---|---|---|
| 2005/0192024 A1* | 9/2005 | Sheynblat | 455/456.1 |

FOREIGN PATENT DOCUMENTS

| EP | 1443791 A1 | | 8/2004 |
|---|---|---|---|
| EP | 1443791 | * | 2/2009 |
| WO | 2009/096839 A1 | | 8/2009 |
| WO | WO/2009/096839 | * | 8/2009 |

OTHER PUBLICATIONS

3rd Generation Partnership Project, "Stage 2 Functional Specification of User Equipment (UE) Positioning in E-UTRAN (Release 9)," 3GPP TS 36.305 v9.0.0, Technical Specification Group Radio Access Network—Evolved Universal Terrestrial Radio Access Network (E-UTRAN), Sep. 2009, pp. 8 & 47.

3rd Generation Partnership Project, "Evaluation of Path-Loss Technologies for Location Services (Release 8)," 3GPP TR 25.907 v0.5.0, Technical Specification Group Services and System Aspects, Sep. 2009, pp. 9-10 & 35-36.

3rd Generation Partnership Project, "Protocol Specification (Release 9)," 3GPP TS 36.331 v9.0.0, Technical Specification Group Radio Access Network—Evolved Universal Terrestrial Radio Access (E-UTRA)—Radio Resource Control (RRC), Sep. 2009, p. 59.

3rd Generation Partnership Project, "Universal Geographical Area Description (GAD) (Release 8)," 3GPP TS 23.032 v8.0.0, Technical Specification Group Services and System Aspects, Dec. 2008.

(Continued)

*Primary Examiner* — Ajit Patel
*Assistant Examiner* — Myron K Wyche
(74) *Attorney, Agent, or Firm* — Coats & Bennett, P.L.L.C.

(57) ABSTRACT

High precision UE position estimates derived by OTDOA positioning in an LTE network are provided to other networks (e.g., WCDMA and/or GSM), along with inter-RAT measurements performed on the other networks, to support fingerprinted positioning databases in the other networks. Signaling is provided enabling LTE UE position estimates to be used as reference points in the fingerprinting database in each of GSM control plane AECID positioning, GSM user plane AECID positioning, WCDMA control plane AECID positioning, and WCDMA user plane AECID positioning. In support thereof, inter-RAT measurement supporting the population of databases in WCDMA and GSM, using fingerprints and reference measurements in LTE; the use of OTDOA positioning to generate the LTE UE position estimates, and the required signaling are disclosed. The AECID databases in WCDMA and GSM networks do not have own-network serving cells at the top hierarchical level, since the inter-RAT measurements are performed in LTE.

23 Claims, 8 Drawing Sheets

OTHER PUBLICATIONS

3rd Generation Partnership Project, "Radio Access Network Application Part (RANAP) Signalling (Release 8)," 3GPP TS 25.413 v8.3.0, Technical Specification Group Radio Access Network—UTRAN Iu Interface, Jun. 2009.

Wigren, "Adaptive Enhanced Cell-ID Fingerprinting Localization by Clustering of Precise Position Measurements," IEEE Transactions on Vehicular Technology, Sep. 2007, pp. 3199-3209, vol. 56, No. 5.

* cited by examiner

FIG. 1
*(PRIOR ART)*

|   8   |   7   |   6   |   5   |   4   |   3   |   2   |   1   |                              |
|---|---|---|---|---|---|---|---|---|
| 0 | 1 | 0 | 1 | \multicolumn{4}{c|}{NUMBER OF POINTS} | OCTET 1 |

| | |
|---|---|
| S1 | OCTET 2 |
| DEGREES OF LATITUDE OF POINT 1 | OCTET 3 |
| | OCTET 4 |
| | OCTET 5 |
| DEGREES OF LATITUDE OF POINT 1 | OCTET 6 |
| | OCTET 7 |
| ... | |
| Sn | OCTET 6n-4 |
| DEGREES OF LATITUDE OF POINT n | OCTET 6n-3 |
| | OCTET 6n-2 |
| | OCTET 6n-1 |
| DEGREES OF LATITUDE OF POINT n | OCTET 6n |
| | OCTET 6n+1 |

LTE FINGERPRINTING POSITIONING REFERENCES FOR OTHER CELLULAR SYSTEMS

RELATED APPLICATIONS

This application claims priority to U.S. Provisional Patent Application Ser. No. 61/247,145, filed 30 Sep. 2009 and titled "LTE Fingerprinting Positioning References for Other Cellular Systems," and PCT Application PCT/SE2010/050,275, filed 11 Mar. 2010 and titled "LTE Fingerprinting Positioning References for Other Cellular Systems."

TECHNICAL FIELD

The present invention relates generally to wireless communication networks, and in particular, to using LTE OTDOA positioning and inter-RAT measurements to support fingerprinting position databases in WCDMA and/or GSM systems.

BACKGROUND

Wireless communication systems are a ubiquitous part of modern life in many areas. A number of different wireless communication protocols have been developed. For example, Long Term Evolution (LTE) is a set of enhancements to the Universal Mobile Telecommunications System (UMTS) that supports high data rates, low latency, low implementation and operating costs, and a seamless connection to legacy wireless communication networks.

As another example, Wideband Code Division Multiple Access (WCDMA) is a wideband spread-spectrum channel access protocol utilizing direct-sequence spread spectrum technology and unique codes to multiplex multiple users over a single wide frequency channel. High Speed Packet Access (HSPA) is an extension of WCDMA protocols. HSPA transmits communication data on shared channels, in packets addressed to specific users. HSPA features short Transmission Time Interval (TTI), link adaptation, fast scheduling, fast retransmission and soft-combining, and advanced modulation, resulting in increased data rates, low latency, and increased system capacity.

Yet another example of a widely-deployed cellular wireless communication protocol is the Global System for Mobile communications (GSM). General Packet Radio Services (GPRS) is a packet data service extension to GSM. Enhanced Data rates for GSM Evolution (EDGE) is a 3G extension to GSM that increases the capacity and performance of GSM and GPRS networks.

Accurately determining the geographic position of a mobile user within a wireless communication network is an ongoing challenge of wireless telecommunications development. Government mandates, such as the E-911 positioning requirements in North America, and commercial Location Based Services (LBS) demand rapid and accurate position determination. Several position determination methods, of varying accuracy and complexity, are known in the art. These include cell ID positioning, Round Trip Timing (RTT) positioning, Time Difference of Arrival (TDOA) positioning, Assisted Global Positioning System (A-GPS) positioning, and fingerprinting positioning.

Cell ID Positioning

The description herein of cell ID positioning is directed toward the WCDMA cellular system. However, the polygon format is anticipated to be available also in the coming LTE cellular standard. In GSM a simpler cell description is used. In any event, the description of specific cell descriptions and data structures is exemplary only, and not limiting.

All cellular wireless communication systems are divided into cells, each cell served by one specific base station, referred to in LTE as NodeB or enhanced NodeB (eNodeB), and in other network protocols as Base Station (BS), Radio Base Station (RBS), or Base Transceiver Station (BTS). Each eNodeB may serve more than one cell. The important point from a positioning and navigation perspective is that the cell where a specific mobile terminal or User Equipment (UE) is located, is known in the cellular system. Hence, after determination of the geographical area covered by a specific cell, it can be stated that the UE is located somewhere within that geographical area, as long as it is connected to the system, and the reported cell identity of the serving cell is equal to the cell identity of the particular geographical area.

In several systems, including the WCDMA system, the preferred representation of the geographical extension of the cell is given by a cell polygon format. This format is described in the 3GPP, Technical Specification 23.032, "Universal Geographical Area Description (GAD)," the disclosure of which is incorporated herein by reference in its entirety. The extension of a cell is described by 3 to 15 corners of a closed polygon which does not intersect itself. The format is two-dimensional and the corners are determined as pairs of longitudes and latitudes in the WGS84 geographical reference system.

The cell identity positioning method in WCDMA is described below. This description assumes that the positioning operates over the Radio Access Network Application Part (RANAP) interface, as described in 3GPP, Technical Specification 25.413, "UTRAN Iu interface RANAP signalling," the disclosure of which is incorporated herein by reference in its entirety. The procedures are similar for GSM and control plane LTE.

1. The message LOCATION REPORTING CONTROL is received in the Serving Radio Network Controller (SRNC) over the RANAP interface.
2. The quality of service (QoS) parameters (most importantly, accuracy and response time) of the LOCATION REPORTING CONTROL message is such that the RNC selects the cell identity positioning method.
3. The SRNC determines the serving cell identity of the positioned UE (special procedures may apply in case the UE is in soft(er) handover with multiple base stations), and retrieves the pre-stored polygon that represents the extension of the serving cell.
4. The SRNC sends the resulting cell polygon back to the core network over the RANAP interface, using the cell polygon format in a LOCATION REPORT message.

Figure 1:
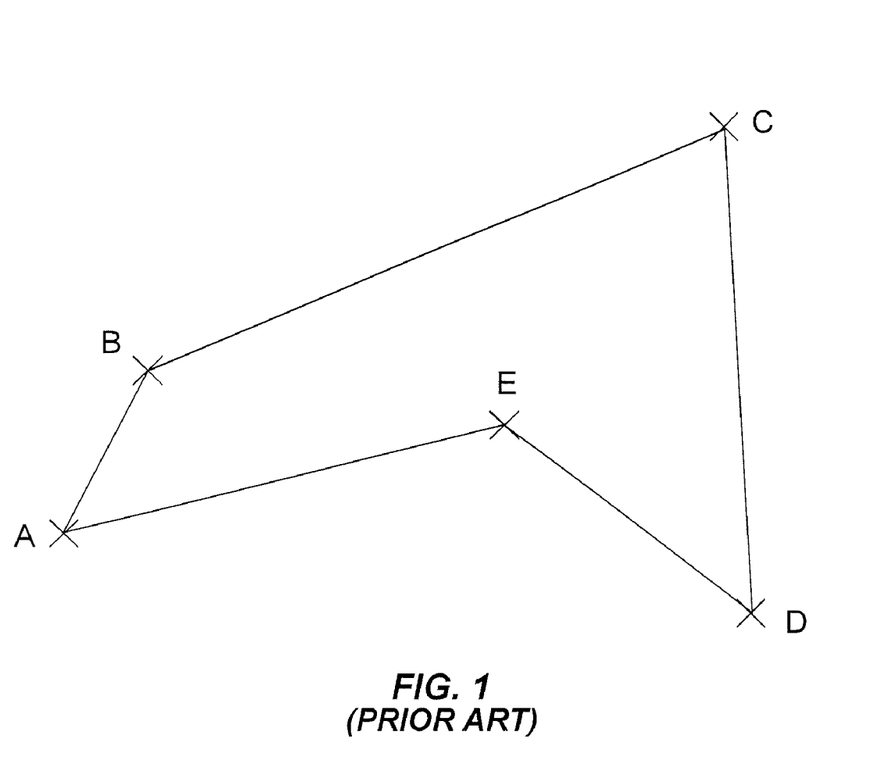
FIG. 1 is an example of a prior art cell description polygon.

FIG. 1 depicts a representative cell as described by the cell polygon format. The geographical extension of a cell is described by 3 to 15 corners, labeled A-E in FIG. 1, of a closed polygon which does not intersect itself. The format is two-dimensional and the corners are determined as pairs of longitude and latitude in the WGS84 geographical reference system. The eNodeB is normally located close to one of the corners of the cell polygon that the eNodeB serves.

Figure 2:
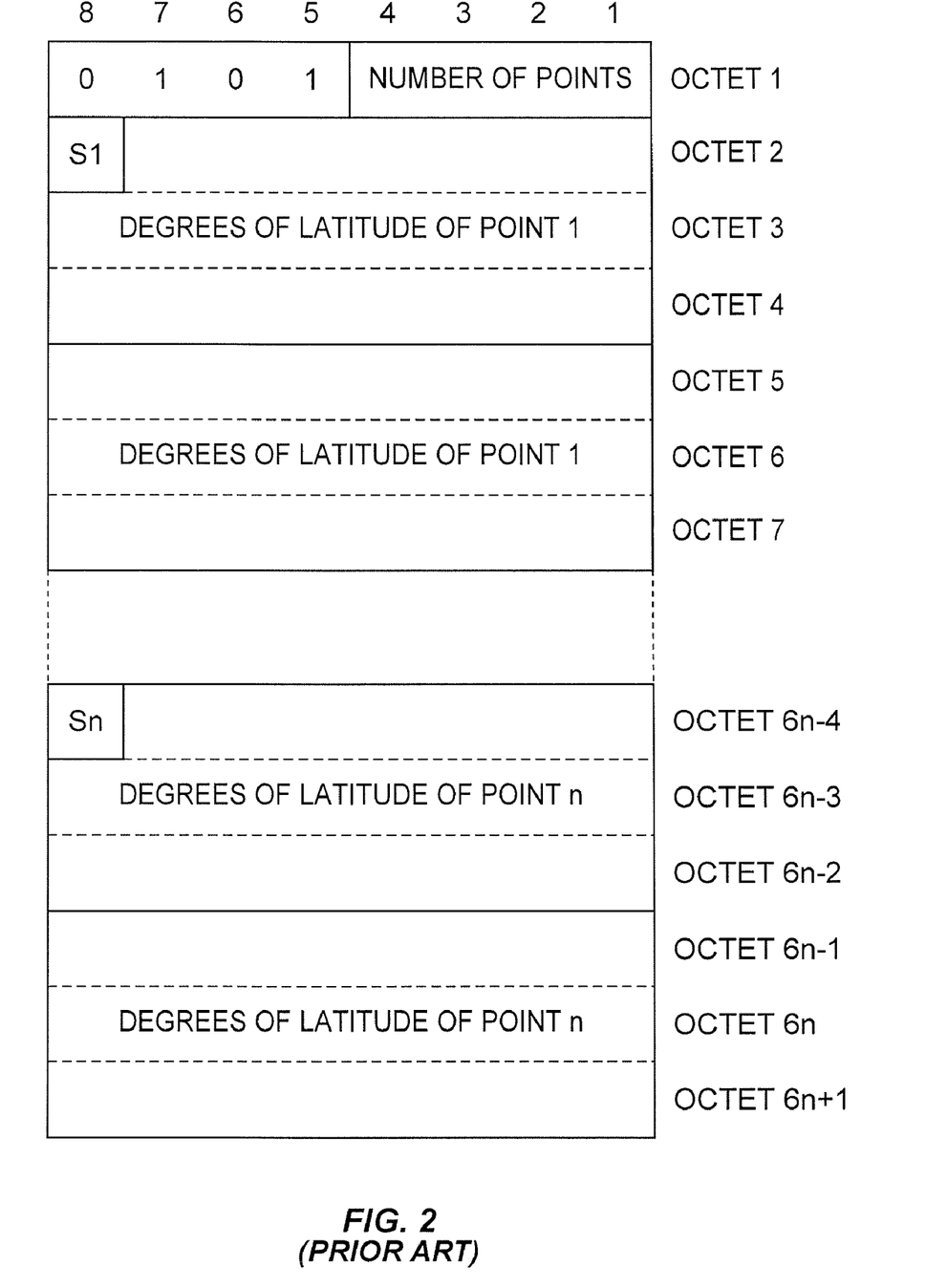
FIG. 2 is a representation of a prior art polygon message information element.

FIG. 2 depicts a 3GPP Polygon message Information Element (IE). This IE is present in the LOCATION REPORT message that is returned to the core network over the RANAP interface after a successful cell identity positioning operation.

It should be noted that due to the complexity of the radio propagation, the cell polygon format is only an approximation of the extension of the true cell. The selection of the polygon format is dictated by the need to have a reasonably flexible geographical representation format, taking, e.g., computation complexities and reporting bandwidths into account.

Since the polygon format approximates the cell extension, the polygon is normally pre-determined in the cell-planning tool to represent the cell extension with a certain confidence. The confidence is the probability that the terminal is actually located within the reported region, in this case bounded by the cell polygon.

The accuracy of the cell identity positioning method is limited by the size of the cell, which prevents it from being used in more sophisticated navigation applications. Its main advantages include a very low response time as well as the fact that it is widely spread and always available where there is cellular coverage. The cell identity method is also straightforward to implement and has no UE impact. These advantages have led to an interest for the development of E-cell ID (enhanced cell identity) positioning methods that aim at enhancing the accuracy of the basic cell identity method, while retaining the advantages of the method.

Round Trip Time and Timing Advance Positioning

The most important E-cell ID positioning method augments the cell ID with round trip time (RTT, in WCDMA) or timing advance (TA, in GSM and LTE) measurements.

Figure 3:
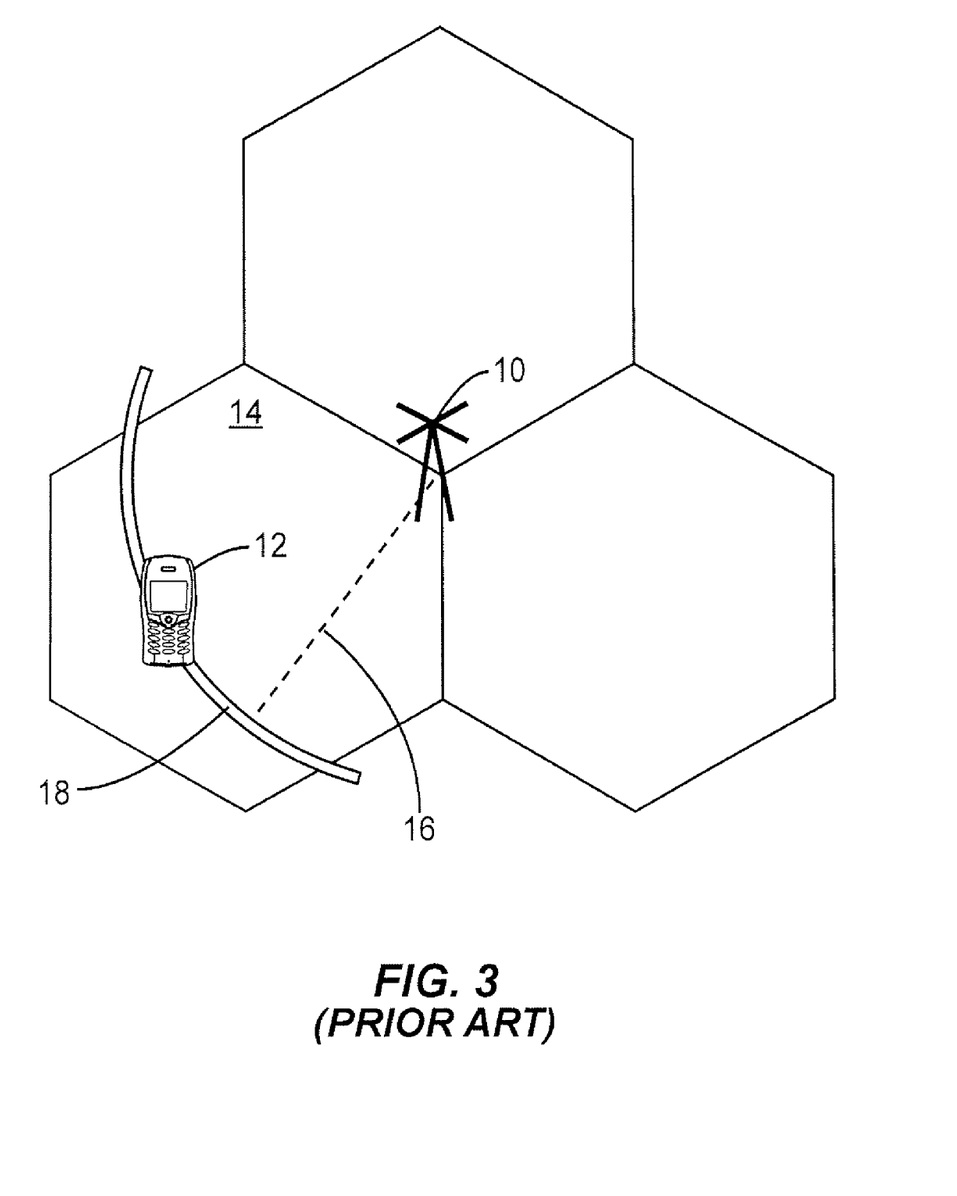
FIG. 3 is a functional block diagram depicting prior art round trip time positioning in a cell.

This principle for enhanced cell identity positioning aims at combining the cell extension model (the polygon) with a distance measure. The round trip time measurement principle is depicted in FIG. 3. Briefly, the travel time of radio waves from the RBS 10 to the UE 12 in the cell 14, and back, is measured, with the latency of the terminal subtracted. The distance 16 from RBS 10 to UE 12 then follows from the formula $$r = c\frac{RTT}{2},$$

where RTT is the round trip time and c is the speed of light.

The round trip time measurement alone defines a circle, or if the inaccuracy is accounted for, a circular strip 18, around the RBS 10. By combining this information with the cell polygon, left and right angles of the circular strip 18 can be computed. The UE 12 position is determined as the intersection of the serving cell 14 and the circular strip 18.

Time Difference of Arrival Positioning

Figure 4:
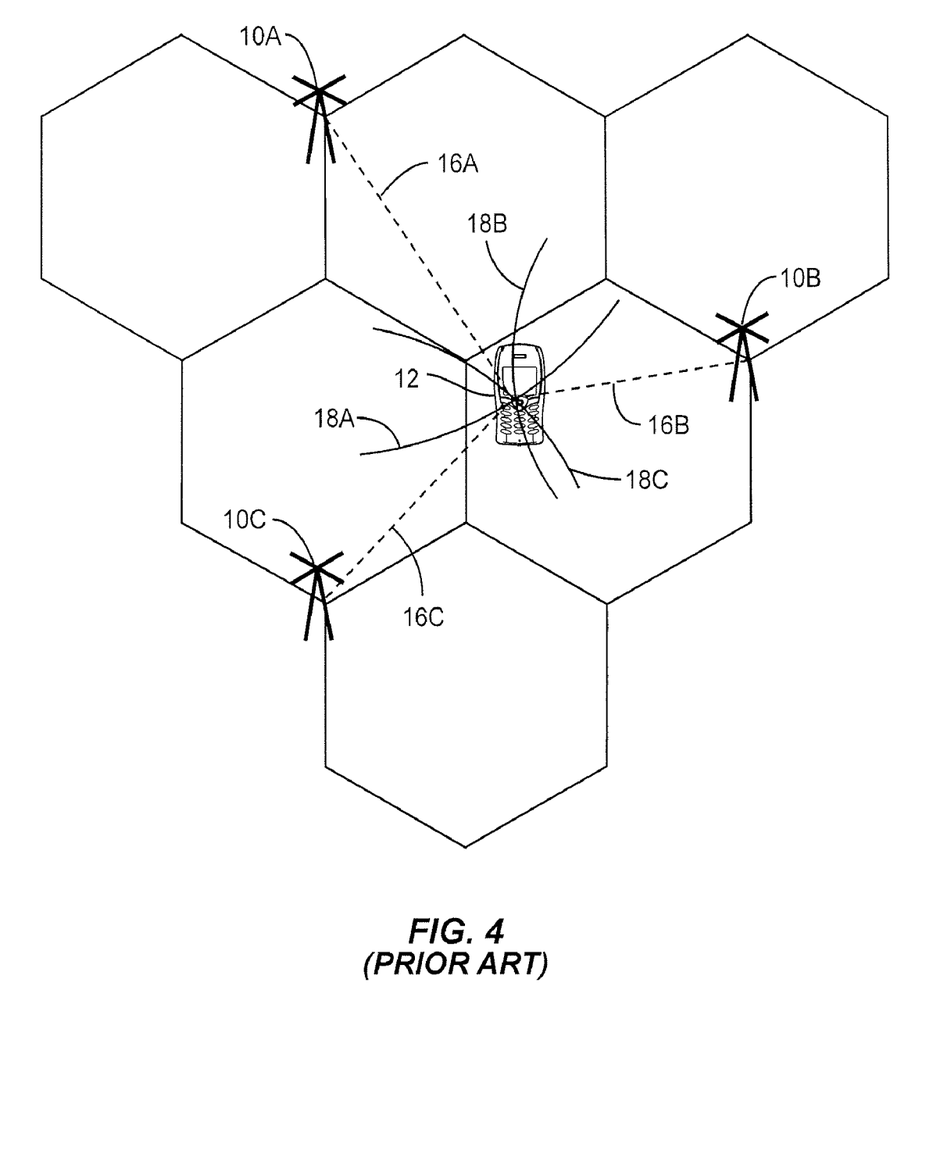
FIG. 4 is a functional block diagram depicting prior art observed time difference of arrival positioning in a cell.

The Observed Time Difference Of Arrival (OTDOA) method relies on measurements, typically on some pilot radio signal, from multiple eNodeBs. The measurement is performed by means of correlation with the known signals of the eNodeBs measured upon. A representative OTDOA setup is depicted in FIG. 4. Hyperbolas 18A-C, representing time differences obtained between eNodeBs, are constructed. The intersection of said hyperbolas determines the position of the UE. The following relations between the measured TOAs in the UE 12, the transmission times from the eNodeBs 10A-C, and the distances 16A-C between the UE 12 and the eNodeBs 10A-C follow:

$$t_{TOA,1} + b_{clock} = T_1 + \|r_1 - r_{Terminal}\|/c$$

$$\vdots$$

$$t_{TOA,n} + b_{clock} = T_n + \|r_n - r_{Terminal}\|/c.$$

where $t_{TOA,i}$, i=1, ..., n denotes the measured time of arrivals (TOAs) in the terminal, $T_i$, i=1, ..., n denotes the transmission times from the eNodeB 10A-C and c is the speed of light. The boldface quantities are the (vector) locations of the eNodeB 10A-C and the UE 12. $b_{clock}$ denotes the unknown clock bias of the UE 12 with respect to cellular system time. Now, in TDOA positioning, time of arrival differences with respect to the own site are formed according to $$t_{TDOA,2} = t_{TOA,2} - t_{TOA,1} = T_2 - T_1 + \|r_2 - r_{Terminal}\|/c - \|r_1 - r_{Terminal}\|/c$$

$$\vdots$$

$$t_{TDOA,n} = t_{TOA,n} - t_{TOA,1} = T_n - T_1 + \|r_n - r_{Terminal}\|/c - \|r_1 - r_{Terminal}\|/c.$$

In these n−1 equations, the left-hand sides are known (with some additional measurement error), provided that the time of transmission differences (denoted the real time differences) can be measured. This is normally achieved with dedicated hardware called location measurement units (LMUs), or by other procedures. Further, the locations of the eNodeBs, $r_i$, i=1, ..., n, can be accurately surveyed and so they are known as well. What remains unknown is the UE 12 location, i.e., $$r_{Terminal} = (x_{Terminal} y_{Terminal} z_{Terminal})^T.$$

In the more common case, a two dimensional positioning is performed. The unknown position is then $$r_{Terminal} = (x_{Terminal} y_{Terminal})^T.$$

It then follows that at least three time of arrival differences are needed in order to find a 3D terminal position and that at least two time of arrival differences are needed in order to find a 2D terminal position. This, in turn, means that at least four sites need to be detected for 3D terminal positioning and at least three sites need to be detected for 2D terminal positioning. In practice, accuracy can be improved if more measurements are collected and a maximum likelihood solution is introduced. There may also be multiple (false) solutions in cases where only a minimum number of sites are detected.

The OTDOA method belongs to the set of high precision positioning methods. However, the inaccuracy is significantly larger than that of A-GPS. The main advantage of OTDOA is that it provides high precision positioning also indoors, a situation where the availability of A-GPS is very limited.

Assisted GPS Positioning

Figure 5:
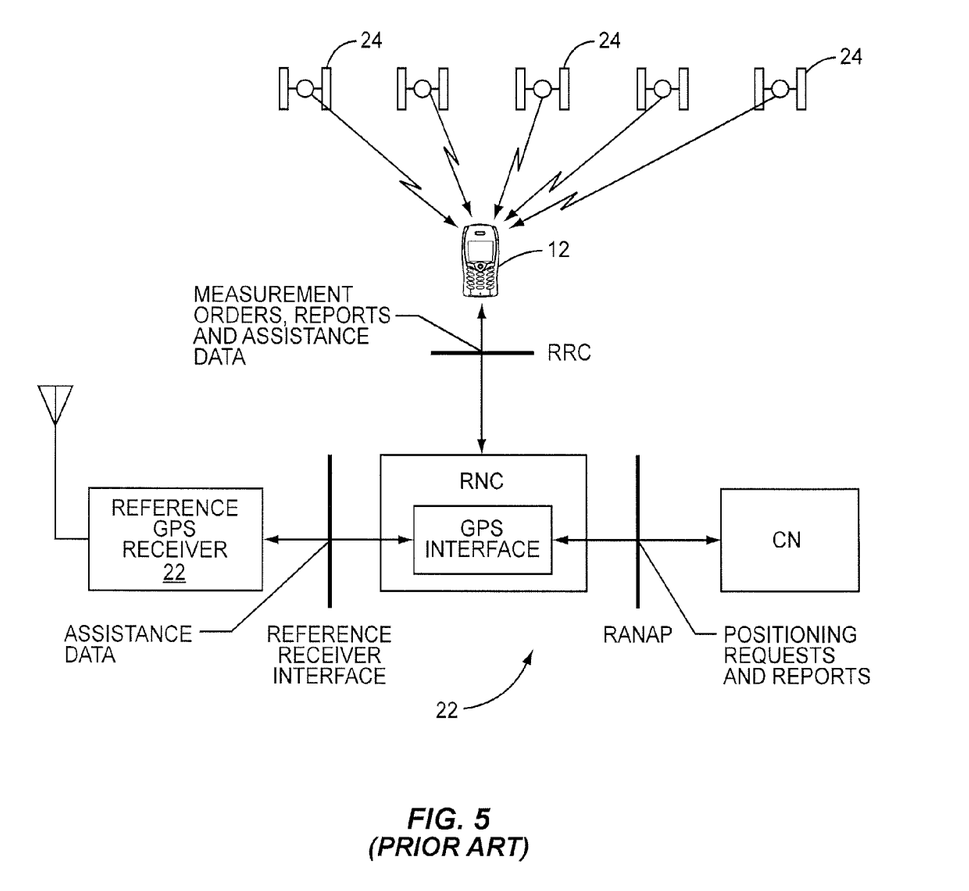
FIG. 5 is a functional block diagram depicting prior art assisted GPS positioning.

Assisted GPS (A-GPS) positioning is an enhancement of the global positioning system (GPS). FIG. 5 depicts an example of an A-GPS positioning system. GPS reference receivers 20 attached to a cellular communication system 22 collect assistance data from GPS satellites 24, such as ephemeris data. The assistance data, when transmitted to GPS receivers in UEs 12 connected to the cellular communication system 22, enhance the performance of the UE GPS receivers. Typically, A-GPS accuracy can become as good as ten meters without differential operation. The accuracy becomes worse in dense urban areas and indoors, where the sensitivity is most often not high enough for detection of the very weak signals from the GPS satellites 24.

Fingerprinting Positioning

Another positioning approach is provided by so-called fingerprinting positioning. One variant of this method is e.g. described in the paper by T. Wigren, "Adaptive enhanced cell-ID fingerprinting positioning by clustering of precise position measurements", published in IEEE Trans. Vehicular Tech., vol. 56, no. 5, 2007, the disclosure of which is incorporated herein by reference in its entirety. Fingerprinting positioning provides an accuracy somewhere in between the high precision positioning methods and the enhanced cell ID methods.

Fingerprinting positioning algorithms can operate by creating a radio fingerprint for each point of a fine coordinate grid that covers the Radio Access Network (RAN). The fingerprint may for example comprise:

- The cell Ids that are detected by the terminal, in each grid point
- Quantized path loss or signal strength measurements, with respect to multiple eNodeBs, performed by the UE, in each grid point. Note, an associated ID of the eNodeB may also be needed.
- Quantized TA, in each grid point. Note, an associated ID of the eNodeB may also be needed.
- Radio connection information like the radio access bearer (RAB).

Whenever a position request arrives to the positioning method, a radio fingerprint is first measured, after which the corresponding grid point is looked up and reported. Of course, this requires that the point is unique.

The database of fingerprinted positions (the radio map) can be generated in several ways. A first alternative would be to perform an extensive surveying operation that performs fingerprinting radio measurements repeatedly for all coordinate grid points of the RAN. The disadvantages of this approach include the fact that the surveying required becomes substantial, even for small cellular networks. Also, the radio fingerprints are in some cases (e.g., signal strength) sensitive to the orientation of the UE, a fact that is particularly troublesome for handheld UEs. For fine grids, the accuracies of the fingerprinted positions therefore become highly uncertain. This is unfortunately seldom reflected in the accuracy of the reported geographical result.

Another approach is to replace the fine grid by high precision position measurements of opportunity, and to provide fingerprinting radio measurements for said points. This avoids the above drawbacks. However, algorithms for clustering of high precision position measurements of opportunity must be defined, and algorithms for computation of geographical descriptions of the clusters also must be defined. These two problems have been solved in the Adaptive Enhanced Cell ID (AECID) positioning method fielded by Ericsson, and described in the above-referenced paper by Wigren.

However, there remains no high precision positioning method with sufficient indoor coverage in WCDMA and GSM that can be used for automatic generation of reference measurements, for the fingerprinting database. Additionally, there is no signaling defined for:

- using the OTDOA method of the LTE system for reference measurements;
- using inter-Radio Access Technology (inter-RAT) measurements performed in the LTE system for generation of associated fingerprints for the GSM and WCDMA cellular systems; or
- merging the information in the above two points with the fingerprinting databases that are fed with reference measurements from within GSM and WCDMA.

SUMMARY

According to one or more embodiments disclosed and claimed herein, high precision position estimates derived by OTDOA positioning in an LTE network are provided to other networks (e.g., WCDMA and/or GSM), along with inter-RAT measurements performed on the other networks, to support fingerprinted positioning databases in the other networks. In particular, the applicability of Ericsson's Adaptive Enhanced Cell ID (AECID) fingerprinting algorithm is enhanced to cover indoor scenarios in WCDMA and GSM. In one embodiment, AECID fingerprinting utilizes LTE observed time difference of arrival (OTDOA) positioning methodology to provide high precision positioning with indoor coverage (or other areas with poor GPS reception). In other embodiments, LTE OTDOA position fixes are used as reference points also for the AECID positioning method in WCDMA and GSM.

Embodiments relate to signaling that enables LTE OTDOA (and A-GPS) position fixes to be used as reference points in the fingerprinting data base generation of the AECID algorithm, in each of the GSM control plane AECID positioning, GSM user plane AECID positioning, WCDMA control plane AECID positioning, and WCDMA user plane AECID positioning.

In some embodiments, in order to achieve the above goals, inter-RAT measurements are performed in the LTE system, that allow for: populating databases of WCDMA and GSM, using fingerprints and reference measurements in LTE; using the OTDOA positioning method to achieve this goal; and providing the signaling means to achieve this goal. Furthermore, embodiments described and claimed herein allow for the creation of AECID databases that do not have own-network serving cells at the top hierarchical level—since the UE is connected to LTE and using inter-RAT measurements, there is no serving cell in the WCDMA or GSM networks.

One embodiment relates to a method of providing fingerprinted position estimates by a UE in an LTE wireless communication network to one or more other wireless communication networks. Signals are received from a plurality of transmitters in the LTE network. OTDOA positioning measurements are performed from the received signals. An estimate of the UE position based on the OTDOA measurements is obtained. Inter-RAT measurements are performed on at least one of a WCDMA and GSM network. The UE position estimate based on the OTDOA measurements, and one or more associated inter-RAT measurements, are transmitted to the WCDMA/GSM network(s) on which the inter-RAT measurements were performed.

Another embodiment relates to a method of populating an Adaptive Enhanced Cell ID (AECID) database in one of a WCDMA or GSM wireless communication network. A UE position estimate based on OTDOA measurements in the LTE network and one or more inter-RAT measurements performed on the WCDMA or GSM wireless communication network are obtained from a UE connected to an LTE wireless network. The UE position estimate, fingerprinted by the inter-RAT measurement(s), is entered into an AECID database.

Yet another embodiment relates to a UE including a first transceiver rendering the UE operative in an LTE network. The UE also includes at least one of a second transceiver rendering the UE operative in a WCDMA network and a third transceiver rendering the UE operative in a GSM network.

The UE further includes a controller operative to cause the UE to perform OTDOA measurements in the LTE network and inter-RAT measurements in at least one of the WCDMA network and GSM network.

DETAILED DESCRIPTION

In the prior art, due to the limited indoor coverage of A-GPS, generation of indoor high precision reference positions needed by the AECID positioning method has required special procedures. This follows since there is no other practical high precision positioning method than A-GPS available in WCDMA and GSM. However, with the current standardization of a terrestrial observed time difference of arrival (OTDOA) positioning method for the LTE system, such a high precision method with indoor coverage is becoming available in LTE for automatic generation of reference measurements. According to embodiments of the present invention, this fact is used to give the AECID positioning method a complete coverage in LTE systems. Embodiments disclosed herein allow LTE OTDOA position fixes to be used as reference points also for the AECID positioning method in WCDMA and GSM.

Architecture and Overview

Figure 6:
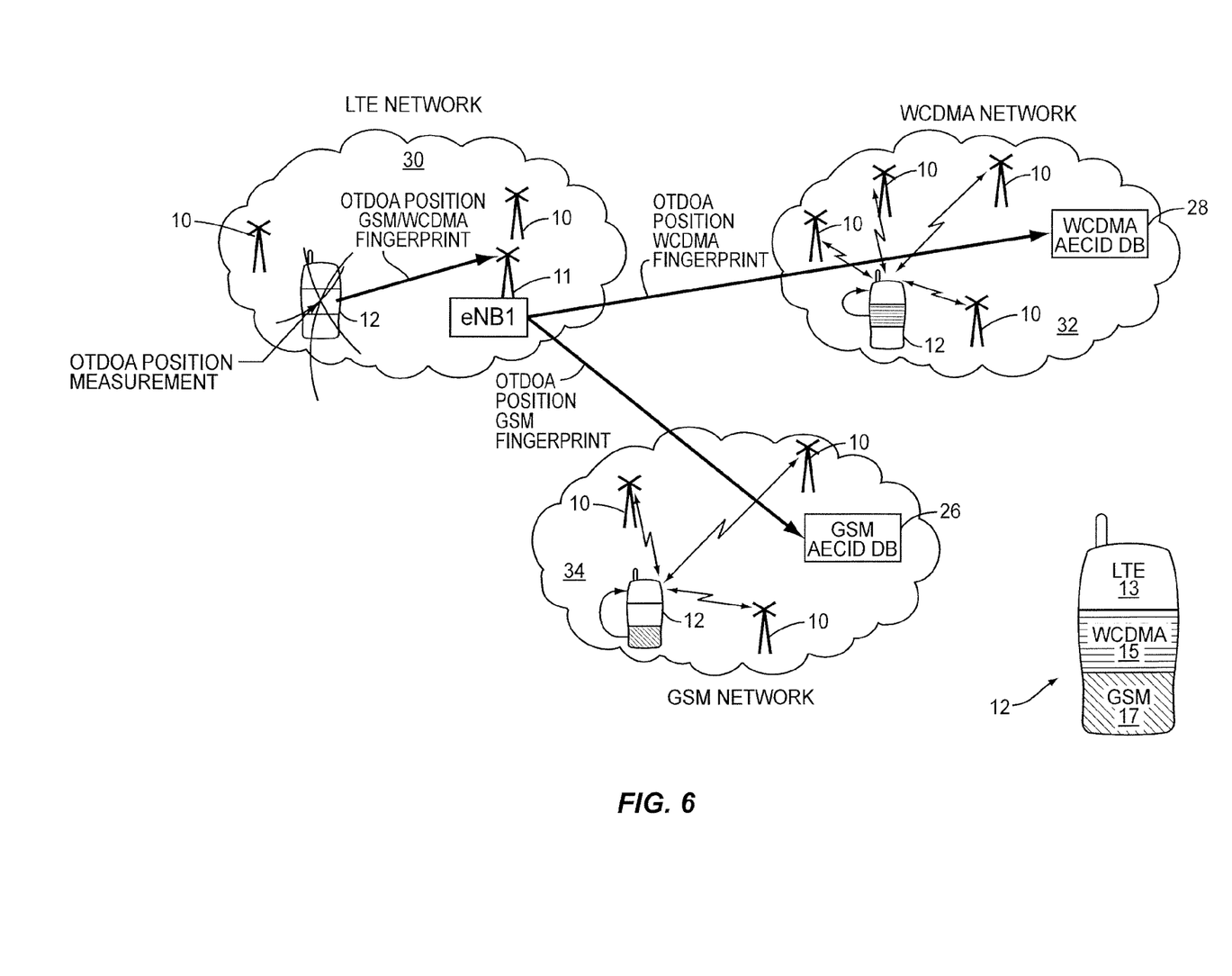
FIG. 6 is a functional block diagram depicting the inter-RAT fingerprinting positioning assistance architecture.
Figure 7:
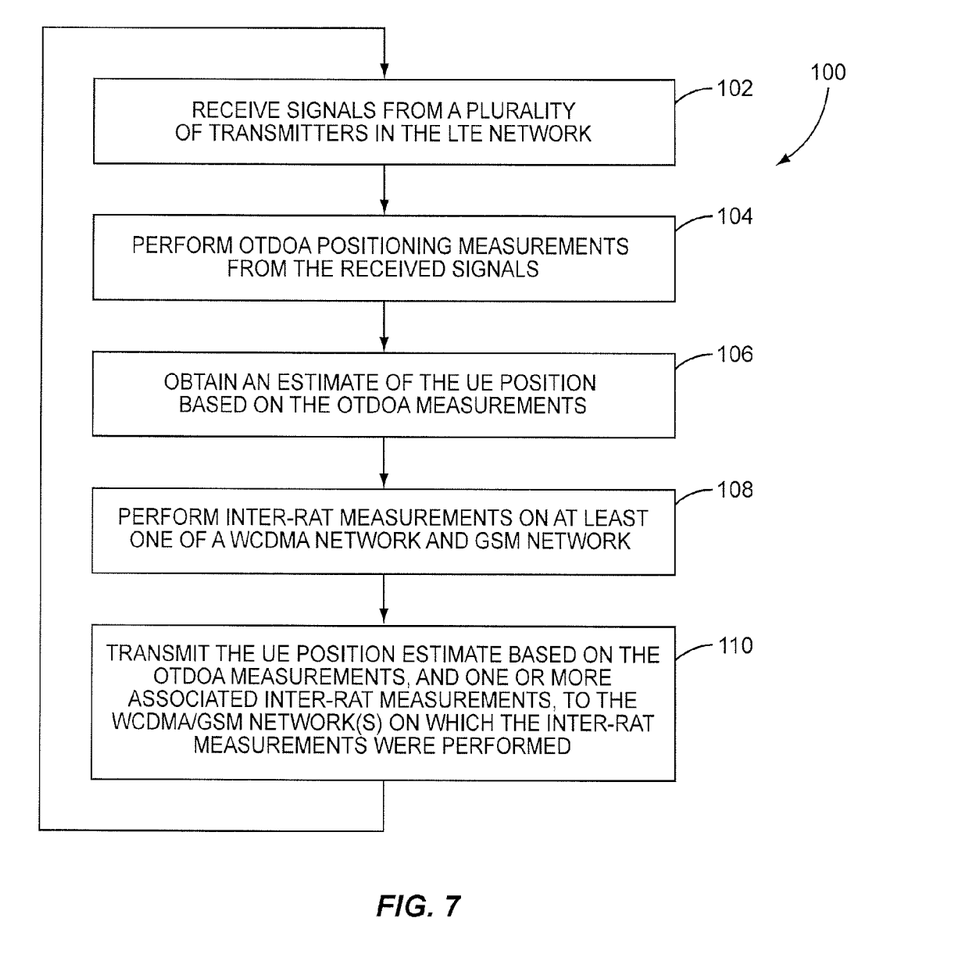
FIG. 7 is a flow diagram of a method of providing fingerprinted position estimates by a UE in an LTE network to one or more other wireless networks.

FIG. 6 depicts the architecture in which embodiments of the present invention operate, and FIG. 7 depicts a method 100 of providing fingerprinted position estimates. A tri-mode UE 12 is assumed. That is, the UE 12 includes a LTE-compatible transceiver 13 rendering the UE 12 operative in an LTE network 30. The UE 12 additionally includes at least one of a WCDMA transceiver 15 operative in a WCDMA network 32, and a GSM transceiver 17 operative in GSM network 34 (both are depicted in FIG. 6). Although depicted as separate networks 30, 32, 34 in FIG. 6 for clarity, it is envisioned that the networks 30, 32, 34 at least partially overlap the same geographic area. The method 100 begins when the LTE network 30 determines that an OTDOA positioning is to be performed for a UE 12. The may result from the failure of an A-GPS positioning attempt, since the A-GPS positioning method is normally the first choice, due to its superior accuracy. However, an A-GPS positioning and an OTDOA positioning may be initiated in parallel. It is then only when the OTDOA method is the only successful method that the rest of the method 100 is performed. The primary reason for this is that a failure of A-GPS positioning and a success of OTDOA positioning indicates an indoor UE 12 location.

The LTE radio portion 13 of UE 12 hence first performs OTDOA measurements by receiving signals from a plurality of transmitters 10 in the LTE network 30 (block 102). OTDOA positioning measurements are then performed on the received signals (block 104). These measurements are then combined, such as in the UE 12, to formulate an estimate of the UE 12 position (block 106). Alternatively, the combination of OTDOA measurements may be performed in a positioning node of the LTE network 30 (this alternative is not shown in FIG. 6). At this stage an OTDOA position exists in the LTE Radio portion 13 of UE 12.

Then the WCDMA radio portion 15 of UE 12 performs inter-RAT measurements on the WCDMA network 32 (block 108), determining, e.g., cell IDs of adjacent WCDMA base stations 10 as well as signal strength with respect to the WCDMA base stations 10. Note that this step may not necessarily be performed after OTDOA measurements are performed. The measured results are transferred to the LTE radio portion 13 of the UE 12.

The GSM radio portion 17 of UE 12 also performs inter-RAT measurements on the GSM network 34 (block 108), determining, e.g., CGIs of adjacent GSM base stations 10 as well as signal strength with respect to the GSM base stations 10. Note that this step may not necessarily be performed after OTDOA measurements are performed. The measured results are transferred to the LTE radio portion 13 of the UE 12.

When the measurements and computations are complete, an OTDOA position, together with associated measurements that can form WCDMA and GSM fingerprints, are available in the UE 12. The information is signaled to the eNodeB 11 and further, on new proprietary interfaces to the WCDMA AECID database 28 of the WCDMA network 32, and/or the GSM AECID database 26 of the GSM network 34 (block 110). In one embodiment, this signaling may have to be done by first signaling to an LTE positioning node, requiring extensions to the existing interfaces. The signaling over the LTE positioning node is not shown in FIG. 6.

The invention is also applicable when one of the WCDMA AECID databases 28 and the GSM AECID database 26 is lacking.

High Precision Reference Measurements in LTE

As stated above, there are two sources of high precision measurements in LTE. The A-GPS measurement is valid outdoors, whereas the OTDOA measurement can be successful both indoors and outdoors. Hence embodiments of the present invention are advantageously operated in at least two situations.

First, A-GPS and OTDOA are available in the LTE network 30. In this case a failure of A-GPS and success of OTDOA indicates that the UE 12 is indoors, or outdoors where A-GPS coverage is very limited. In this case, the LTE OTDOA measurement, fingerprinted with inter-RAT measurements, will be useful to populate the GSM and WCDMA AECID databases 26, 28, curing the deficiency that no high precision positioning method is available in GSM and WCDMA networks 34, 32.

Second, OTDOA is available in the LTE network 30, but A-GPS is not. In this case the LTE OTDOA measurement, fingerprinted with inter-RAT measurements, can be applied for all OTDOA measurements performed in the LTE network 30.

The following positioning measurements have been standardized in LTE:

Reference signal time difference (RSTD);
UE Global Navigation Satellite System (GNSS) Timing of Cell Frames for UE positioning;
UE GNSS code measurements;
UE Rx–Tx time difference;
Timing advance ($T_{ADV}$);
eNB Rx–Tx time difference;
E-UTRAN GNSS Timing of Cell Frames for UE positioning; and
Angle of Arrival (AoA).

Inter-RAT Measurements in LTE

The following inter-RAT measurements have been standardized in LTE:

UTRA FDD CPICH RSCP—on WCDMA (i.e. inter-RAT type 1);
UTRA FDD carrier RSSI—on WCDMA (i.e. inter-RAT type 1);
UTRA FDD CPICH Ec/No—on WCDMA (i.e. inter-RAT type 1);
GSM carrier RSSI—on GSM (i.e. inter-RAT type 2);
UTRA TDD carrier RSSI—on TDD mode (i.e. inter-RAT type 3);
UTRA TDD P-CCPCH RSCP—on TDD mode (i.e. inter-RAT type 3);
CDMA2000 1x RTT Pilot Strength—CDMA2000 (i.e. inter-RAT type 4); and
CDMA2000 HRPD Pilot Strength—CDMA2000 (i.e. inter-RAT type 4).

Fingerprints and Reference Points for GSM Generated in LTE

In one embodiment, fingerprints generated in GSM consist of the following two information elements:

Cell ID, for a set of close cells; and
Signal strength, for a set of close cells.

Fingerprints and Reference Points for WCDMA Generated in LTE

In one embodiment, fingerprints generated in WCDMA consist of the following two information elements:

Cell ID, for a set of close cells; and
Signal strength, for a set of close cells.

Signaling

Following are descriptions of the signaling between various nodes and entities in the network (e.g., UE 12, eNodeB 11, WCDMA network 32, GSM network 34, and the like) necessary to implement various embodiments of the present invention. The descriptions are presented to describe the system and process to those of skill in the art. However, it is to be understood that, in various embodiments, the order of some steps may be varied, additional hand-shaking may be introduced, and similar changes may be made to the ordered steps listed below, within the scope of the invention.

OTDOA in LTE with WCDMA Inter-RAT

Signaling for both UE-assisted and UE-based embodiments is presented.

UE Assisted OTDOA

1. The positioning node orders LTE OTDOA measurements, by issuing a message to the eNodeB 11 of the serving cell.
2. The positioning node orders fingerprinting measurements (at least one of Cell IDs and signal strengths), by issuing a message to the eNodeB 11 of the serving cell.
3. The eNodeB 11 compiles a measurement order, for OTDOA measurements, and sends it to the UE 12 over the LTE air interface.
4. The UE 12 performs OTDOA measurements.
5. The UE 12 reports the obtained OTDOA measurements to the eNodeB 11 over the LTE air-interface.
6. Optionally, the eNodeB 11 compiles and transmits reporting orders to the eNodeBs of the OTDOA measured results list, ordering a report of real time difference related information. Note: This information may also be kept Updated in the positioning node, in which case step 6 is not needed.
7. Optionally, the eNodeB 11 receives messages with real time difference related information, from said eNodeBs.
8. The eNodeB 11 compiles a measurement order, for WCDMA 32 inter-RAT measurements (at least one of cell ID or signal strength), and sends it to the UE 12 over the LTE air interface.
9. The UE 12 performs inter-RAT measurements for WCDMA 32.
10. The UE 12 reports the obtained inter-RAT measured results to the eNodeB 11 over the LTE air interface.
11. The eNodeB 11 collects the OTDOA position measurements, the inter-RAT measurements, and the optionally real time difference measurements, and sends them together to the positioning node. Alternatively, the three classes of information may be sent separately, together with an ID that shows their relation.
12. The positioning node computes the geographical OTDOA position of the UE 12 and the radio fingerprint. This is denoted a tagged high precision reference point.
13. The positioning node sends the tagged high precision reference point to the AECID server node of the WCDMA network 32, where the tagged reference position is stored in the database 28.

Note: Many varying embodiments are possible. For example, steps 1 and 2 may be merged to one step. The same applies to step 3 and 8, as well as to steps 5 and 10. The order of inter-RAT and OTDOA measurements may also be changed.

UE Based OTDOA

1. The positioning node orders LTE OTDOA measurements, by issuing a message to the eNodeB 11 of the serving cell. This message may contain real time differences, in case these are kept updated in the positioning node.
2. The positioning node orders fingerprinting measurements (at least one of Cell IDs and signal strengths), by issuing a message to the eNodeB 11 of the serving cell.
3. Optionally, the eNodeB 11 compiles and transmits reporting orders to the eNodeBs of the OTDOA measured results list, ordering a report of real time difference related information. Note: This information may also be kept updated in the positioning node, in which case step 3 and 4 are not needed.

4. Optionally, the eNodeB 11 receives messages with real time difference related information, over the X2 interface.

5. The eNodeB 11 compiles a measurement order, for OTDOA position, and sends it to the UE 12 over the LTE air interface. The real time differences are included in the message to facilitate the position calculation. Note: There are other alternatives for distribution of real time differences to UEs, all of which are within the scope of the present invention. For example, they can be broadcast.

6. The UE 12 performs OTDOA measurements, and computes a position of the UE 12.

7. The UE 12 reports the obtained position to the eNodeB 11 over the LTE air interface.

8. The eNodeB 11 compiles a measurement order, for WCDMA 32 inter-RAT measurements (at least one of cell ID or signal strength), and sends it to the UE 12 over the LTE air interface.

9. The UE 12 performs inter-RAT measurements for WCDMA 32.

10. The UE 12 reports the obtained inter-RAT measured results to the eNodeB 11 over the LTE air interface, 11. The eNodeB 11 collects the position and the inter-RAT measurements, and then sends them together to the positioning node. Alternatively, the two classes of information may be sent separately, together with an ID that shows their relation.

12. The positioning node combines the position of the UE 12 and the radio fingerprint. This is denoted a tagged high precision reference point.

13. The positioning node sends the tagged high precision reference point to the AECID server node of the WCDMA network 32, where the tagged reference position is stored in the database 28.

Note: Many varying embodiments are possible. For example, step 1 and 2 may be merged to one step. The same applies to step 5 and 8, as well as to steps 7 and 10. The order of inter-RAT and OTDOA measurements may also be changed.

OTDOA in LTE with GSM Inter-RAT

Signaling for both UE-assisted and UE-based embodiments is presented.

UE Assisted OTDOA

1. The positioning node orders LTE OTDOA measurements, by issuing a message to the eNodeB 11 of the serving cell.

2. The positioning node orders fingerprinting measurements (at least one of Cell Global Identity (CGI) and signal strengths), by issuing a message to the eNodeB 11 of the serving cell.

3. The eNodeB 11 compiles a measurement order, for OTDOA measurements, and sends it to the UE 12 over the LTE air interface.

4. The UE 12 performs OTDOA measurements.

5. The UE 12 reports the obtained OTDOA measurements to the eNodeB 11 over the LTE air interface.

6. Optionally, the eNodeB 11 compiles and transmits reporting orders to the eNodeBs of the OTDOA measured results list, ordering a report of real time difference related information. Note: This information may also be kept updated in the positioning node, in which case step 6 is not needed.

7. Optionally, the eNodeB 11 receives messages with real time difference related information, from said eNodeBs.

8. The eNodeB 11 compiles a measurement order, for GSM 34 inter-RAT measurements (at least one of CGI or signal strength), and sends it to the UE 12 over the LTE air interface.

9. The UE 12 performs inter-RAT measurements for GSM 34.

10. The UE 12 reports the obtained inter-RAT measured results to the eNodeB 11 over the LTE air interface, 11. The eNodeB 11 collects the OTDOA position measurements, the inter-RAT measurements, and the optionally real time difference measurements, and sends them together to the positioning node. Alternatively, the three classes of information may be sent separately, together with an ID that shows their relation.

12. The positioning node computes the geographical OTDOA position of the UE 12 and the radio fingerprint. This is denoted a tagged high precision reference point.

13. The positioning node sends the tagged high precision reference point to the AECID server node of the GSM network 34, where the tagged reference position is stored in the database 26.

Note: Many varying embodiments are possible. For example, steps 1 and 2 may be merged to one step. The same applies to step 3 and 8, as well as to steps 5 and 10. The order of inter-RAT and OTDOA measurements may also be changed.

UE Based OTDOA

1. The positioning node orders LTE OTDOA measurements, by issuing a message to the eNodeB 11 of the serving cell. This message may contain real time differences, in case these are kept updated in the positioning node.

2. The positioning node orders fingerprinting measurements (at least one of CGIs and signal strengths), by issuing a message to the eNodeB 11 of the serving cell.

3. Optionally, the eNodeB 11 compiles and transmits reporting orders to the eNodeBs of the OTDOA measured results list, ordering a report of real time difference related information. Note: This information may also be kept updated in the positioning node, in which case steps 3 and 4 are not needed.

4. Optionally, the eNodeB 11 receives messages with real time difference related information, from said eNodeBs.

5. The eNodeB 11 compiles a measurement order, for OTDOA position, and sends it to the UE 12 over the LTE air interface. The real time differences are included in the message to facilitate the position calculation. Note: There are other alternatives for distribution of real time differences to UEs. For example, they can be broadcast.

6. The UE 12 performs OTDOA measurements, and computes a position of the UE 12.

7. The UE 12 reports the obtained position to the eNodeB 11 over the LTE air interface.

8. The eNodeB 11 compiles a measurement order, for GSM 34 inter-RAT measurements (at least one of cell ID or signal strength), and sends it to the UE 12 over the LTE air interface.

9. The UE 12 performs inter-RAT measurements for GSM 34.

10. The UE 12 reports the obtained inter-RAT measured results to the eNodeB 11 over the LTE air interface, 11. The eNodeB 11 collects the position and the inter-RAT measurements, and then sends them together to the positioning node. Alternatively, the two classes of information may be sent separately, together with an ID that shows their relation.

12. The positioning node combines the position of the UE 12 and the radio fingerprint. This is denoted a tagged high precision reference point.

13. The positioning node sends the tagged high precision reference point to the AECID server node of the GSM network 34, where the tagged reference position is stored in the database 26.

Note: Many varying embodiments are possible. For example, steps 1 and 2 may be merged to one step. The same applies to step 5 and 8, as well as to steps 7 and 10. The order of inter-RAT and OTDOA measurements may also be changed.

Combinations

Signaling for both UE-assisted and UE-based embodiments, obtaining fingerprinting measurements from both WCDMA and GSM networks 32, 34, is presented.

UE Assisted OTDOA

1. The positioning node orders LTE OTDOA measurements, by issuing a message to the eNodeB 11 of the serving cell.

2a. The positioning node orders fingerprinting measurements (at least one of Cell IDs and signal strengths), by issuing a message to the eNodeB 11 of the serving cell.

2b. The positioning node orders fingerprinting measurements (at least one of CGIs and signal strengths), by issuing a message to the eNodeB 11 of the serving cell.

3. The eNodeB 11 compiles a measurement order, for OTDOA measurements, and sends it to the UE 12 over the LTE air interface.

4. The UE 12 performs OTDOA measurements.

5. The UE 12 reports the obtained OTDOA measurements to the eNodeB 11 over the LTE air interface.

6. Optionally, the eNodeB 11 compiles and transmits reporting orders to the eNodeBs of the OTDOA measured results list, ordering a report of real time difference related information. Note: This information may also be kept updated in the positioning node, in which case step 6 is not needed.

7. Optionally, the eNodeB 11 receives messages with real time difference related information, from said eNodeBs.

8a. The eNodeB 11 compiles a measurement order, for WCDMA 32 inter-RAT measurements (at least one of cell ID or signal strength), and sends it to the UE 12 over the LTE air interface.

8b. The eNodeB 11 compiles a measurement order, for GSM 34 inter-RAT measurements (at least one of CGI or signal strength), and sends it to the UE 12 over the LTE air interface.

9a. The UE 12 performs inter-RAT measurements for WCDMA 32.

9b. The UE 12 performs inter-RAT measurements for GSM 34.

10a. The UE 12 reports the obtained inter-RAT measured results for WCDMA 32 to the eNodeB 11 over the LTE air interface, 10b. The UE 12 reports the obtained inter-RAT measured results for GSM 34 to the eNodeB 11 over the LTE air interface, 11. The eNodeB 11 collects the OTDOA position measurements, the inter-RAT measurements for WCDMA 32, the inter-RAT measurements for GSM 34, and the optionally real time difference measurements, and sends them together to the positioning node. Alternatively, the four classes of information may be sent separately, together with an ID that shows their relation.

12. The positioning node computes the geographical OTDOA position of the UE 12 and the radio fingerprint, of WCDMA 32 and GSM 34. This is denoted tagged high precision reference points.

13a. The positioning node sends the tagged high precision reference point to the AECID server node of the WCDMA network 32, where the tagged reference position is stored in the database 28.

13b. The positioning node sends the tagged high precision reference point to the AECID server node of the GSM network 34, where the tagged reference position is stored in the database 26.

Note: Many varying embodiments are possible. For example, steps 1 and 2 may be merged to one step. The same applies to step 3 and 8, as well as to steps 5 and 10. The order of inter-RAT and OTDOA measurements may also be changed. All steps divided into a and b parts may be reversed or merged.

UE Assisted OTDOA

1. The positioning node orders LTE OTDOA measurements, by issuing a message to the eNodeB 11 of the serving cell. This message may contain real time differences, in case these are kept updated in the positioning node.

2a. The positioning node orders fingerprinting measurements (at least one of Cell IDs and signal strengths), by issuing a message to the eNodeB 11 of the serving cell 2b. The positioning node orders fingerprinting measurements (at least one of CGIs and signal strengths), by issuing a message to the eNodeB 11 of the serving cell.

3. Optionally, the eNodeB 11 compiles and transmits reporting orders to the eNodeBs of the OTDOA measured results list, ordering a report of real time difference related information. Note: This information may also be kept updated in the positioning node, in which case step 3 and 4 are not needed.

4. Optionally, the eNodeB 11 receives messages with real time difference related information, from said eNodeBs.

5. The eNodeB 11 compiles a measurement order, for OTDOA position, and sends it to the UE 12 over the LTE air interface. The real time differences are included in the message to facilitate the position calculation. Note: There are other alternatives for distribution of real time differences to UEs. For example, they can be broadcast.

6. The UE 12 performs OTDOA measurements, and computes a position of the UE 12.

7. The UE 12 reports the obtained position to the eNodeB 11 over the LTE air interface.

8a. The eNodeB 11 compiles a measurement order, for WCDMA 32 inter-RAT measurements (at least one of cell ID or signal strength), and sends it to the UE 12 over the LTE air interface.

8b. The eNodeB 11 compiles a measurement order, for GSM 34 inter-RAT measurements (at least one of CGI or signal strength), and sends it to the UE 12 over the LTE air interface.

9a. The UE 12 performs inter-RAT measurements for WCDMA 32.

9b. The UE 12 performs inter-RAT measurements for GSM 34.

10a. The UE 12 reports the obtained inter-RAT measured results for WCDMA 32 to the eNodeB 11 over the LTE air interface, 10b. The UE 12 reports the obtained inter-RAT measured results for GSM 34 to the eNodeB 11 over the LTE air interface, 11. The eNodeB 11 collects the position, the inter-RAT measurements for WCDMA 32 and the inter-RAT measurements for GSM 34, and then sends them together to the positioning node. Alternatively, the three classes of information may be sent separately, together with an ID that shows their relation.

12a. The positioning node combines the position of the UE 12 and the radio fingerprint for WCDMA 32. This is denoted a tagged high precision reference point.

12b. The positioning node combines the position of the UE 12 and the radio fingerprint for GSM 34. This is denoted a tagged high precision reference point.

13a. The positioning node sends the tagged high precision reference point to the AECID server node of the WCDMA network 32, where the tagged reference position is stored in the database 28.

13b. The positioning node sends the tagged high precision reference point to the AECID server node of the GSM network 34, where the tagged reference position is stored in the database 26.

Note: Many varying embodiments are possible. For example, steps 1 and 2 may be merged to one step. The same applies to step 5 and 8, as well as to steps 7 and 10. The order of inter-RAT and OTDOA measurements may also be changed. All steps a and b portions may be reversed or merged.

Merging LTE-Generated Information in GSM and WCDMA AECID Databases

Figure 8:
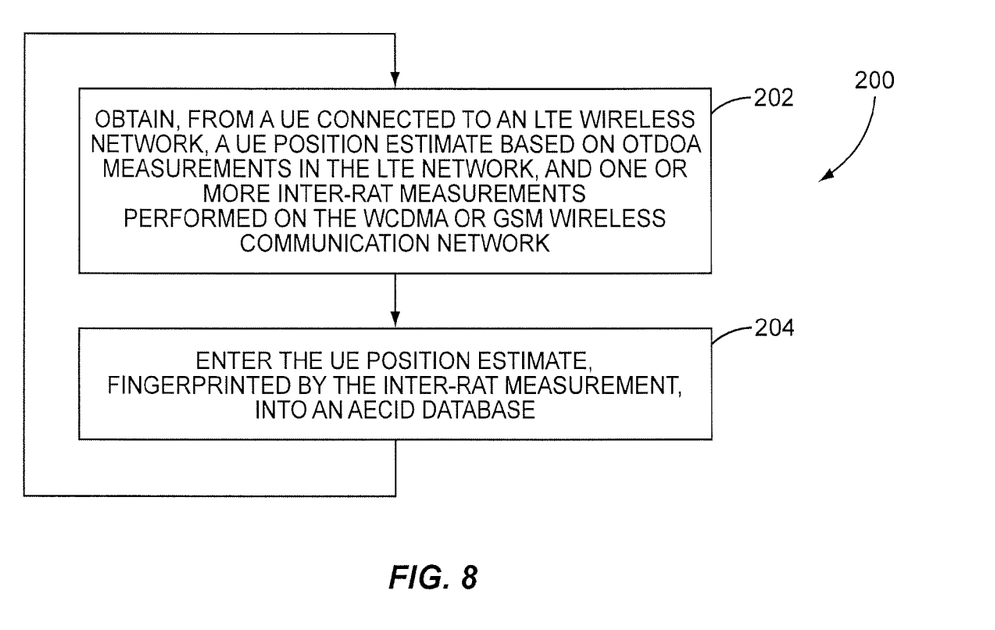
FIG. 8 is a flow diagram of a method of populating an Adaptive Enhanced Cell ID (AECID) database in one of a WCDMA or GSM wireless network.

FIG. 8 depicts a method 200 of populating an AECID database in one or both of a WCDMA and GSM wireless communication network. OTDOA reference position estimates from an LTE network 30, and the associated results of inter-RAT measurements, are received in the AECID database 26, 28 handling nodes of GSM and WCDMA networks 34, 32 (block 202). Fingerprints are created and used to tag each of the reference positions. The fingerprinted reference positions are then entered into the ACED database (block 204). A reasonable database hierarchy would place a serving cell at the top, with reference positions for the fingerprints listed below the associated serving cell. However, in embodiments of the preset invention, there is no serving cell for the inter-RAT measurements, due to the fact that the UE 12 is connected to LTE 30. Accordingly, in one or more embodiments, the fingerprinting database 26, 28 employs a hierarchy that does not require identification of a serving cell 34, 32.

By utilizing inter-RAT measurements in the fingerprinting positioning, embodiments of the present invention provide AECID positioning methods that extend to indoor locations (and other locations where A-GPS positioning is not available). This is highly important considering the fact that most of the cellular phone calls, including emergency phone calls, are placed indoors. This is particularly timely for E-911 positioning requirements in North America.

The present invention may, of course, be carried out in other ways than those specifically set forth herein without departing from essential characteristics of the invention. The present embodiments are to be considered in all respects as illustrative and not restrictive.

What is claimed is:

1. A method of providing fingerprinted position estimates by a UE in an LTE wireless communication network to one or more other wireless communication networks, comprising:

receiving signals from a plurality of transmitters in the LTE network; performing Observed Time Difference Of Arrival (OTDOA) positioning measurements from the received signals; obtaining an estimate of the UE position based on the OTDOA measurements;

performing inter-RAT measurements on at least one of a WCDMA network and GSM network;

transmitting the UE position estimate based on the OTDOA measurements, and one or more associated inter-RAT measurements, to the WCDMA/GSM network(s) on which the inter-RAT measurements were performed.

2. The method of claim 1 wherein obtaining an estimate of the UE position based on the OTDOA measurements comprises computing a position based on the OTDOA measurements.

3. The method of claim 1 wherein obtaining an estimate of the UE position based on the OTDOA measurements comprises:

transmitting the OTDOA measurements to positioning node of the LTE network; and receiving from the positioning node an estimate of the UE position based on the OTDOA measurements.

4. The method of claim 1 wherein performing inter-RAT measurements on a WCDMA network comprises determining at least one of cell ID of one or more WCDMA base stations and determining signal strength with respect to said one or more WCDMA base stations.

5. The method of claim 1 wherein performing inter-RAT measurements on a GSM network comprises determining at least one of CGI of one or more GSM base stations and determining signal strength with respect to said one or more GSM base stations.

6. The method of claim 1 wherein transmitting the UE position estimate based on the OTDOA measurements, and one or more associated inter-RAT measurements, to the relevant WCDMA/GSM network comprises transmitting the position estimate and inter-RAT measurements to a positioning node in the LTE network.

7. The method of claim 1 further comprising transmitting the UE position estimate based on the OTDOA measurements and the inter-RAT measurements to the LTE network.

8. The method of claim 7 wherein transmitting the position estimate and the inter-RAT measurements to the LTE network comprises transmitting the position estimate and inter-RAT measurements to a positioning node in the LTE network.

9. A method of populating an Adaptive Enhanced Cell ID (AECID) database in one of a WCDMA or GSM wireless communication network, comprising:

obtaining from a UE connected to an LTE wireless network, a UE position estimate based on Observed Time Difference Of Arrival (OTDOA) measurements in the LTE network and one or more inter-RAT measurements performed on the WCDMA or GSM wireless communication network; and entering the UE position estimate, fingerprinted by the inter-RAT measurement(s), into an AECID database.

10. The method of claim 9 wherein obtaining the UE position estimate and inter-RAT measurements from the LTE UE comprises obtaining the UE position estimate and inter-RAT measurements from a positioning node in the LTE network.

11. The method of claim 9 wherein the AECID database includes GSM control plane AECID positioning.

12. The method of claim 9 wherein the AECID database includes GSM user plane AECID positioning.

13. The method of claim 9 wherein the AECID database includes WCDMA control plane AECID positioning.

14. The method of claim 9 wherein the AECID database includes WCDMA user plane AECID positioning.

15. The method of claim 9 wherein entering the UE position estimate, fingerprinted by the inter-RAT measurement(s), into an AECID database comprises entering the information into the AECID database without an own-network serving cell at the top hierarchical layer of the database.

16. A user equipment (UE) comprising:
a first transceiver rendering the UE operative in an LTE network;
at least one of a second transceiver rendering the UE operative in a WCDMA network and a third transceiver rendering the UE operative in a GSM network; and
a controller operative to cause the UE to perform Observed Time Difference Of Arrival (OTDOA) measurements in the LTE network and inter-RAT measurements in at least one of the WCDMA network and GSM network; the controller further operative to transmit the OTDOA measurements and inter-RAT measurements to at least one of the WCDMA network and GSM network.

17. The UE of claim 16 wherein the controller is operative to cause the UE to perform OTDOA measurements in the LTE network by:
receiving signals from a plurality of transmitters in the LTE network; and
performing OTDOA positioning measurements on the received signals.

18. The UE of claim 17 wherein the controller is further operative to combine the OTDOA positioning measurements to formulate an estimate of the UE position.

19. The UE of claim 17 wherein the controller is further operative to transmit the OTDOA positioning measurements to a positioning node in the LTE network.

20. The UE of claim 16 wherein the inter-RAT measurements include signal strength with respect to a plurality of base stations in the WCDMA network or GSM network.

21. The UE of claim 16 wherein the inter-RAT measurements include the cell IDs of a plurality of base stations in the WCDMA network.

22. The UE of claim 16 wherein the inter-RAT measurements include the CGIs of a plurality of base stations in the GSM network.

23. The UE of claim 16 wherein the controller is further operative to transmit the OTDOA measurements and inter-RAT measurements to at least one of a WCDMA AECID database in the WCDMA network and a GSM AECID database in GSM network.

* * * * *

UNITED STATES PATENT AND TRADEMARK OFFICE
CERTIFICATE OF CORRECTION

PATENT NO. : 8,401,570 B2
APPLICATION NO. : 12/891994
DATED : March 19, 2013
INVENTOR(S) : Wigren et al.

It is certified that error appears in the above-identified patent and that said Letters Patent is hereby corrected as shown below:

In the Specification:

In Column 7, Line 61, delete "The may" and insert -- This may --, therefor.

In Column 10, Line 25, delete "Updated" and insert -- updated --, therefor.

In Column 11, Line 24, delete "interface," and insert -- interface. --, therefor.

Signed and Sealed this
Seventeenth Day of September, 2013

Teresa Stanek Rea
*Deputy Director of the United States Patent and Trademark Office*